(12) United States Patent
Chin et al.

(10) Patent No.: US 7,302,250 B2
(45) Date of Patent: Nov. 27, 2007

(54) METHOD OF RECOGNIZING FRAUDULENT WIRELESS EMERGENCY SERVICE CALLS

(75) Inventors: Mary W. Chin, Westmont, IL (US); Douglas H. Rollender, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 463 days.

(21) Appl. No.: 10/340,707

(22) Filed: Jan. 13, 2003

(65) Prior Publication Data

US 2004/0203575 A1  Oct. 14, 2004

(51) Int. Cl.
- *H04M 11/04* (2006.01)
- *H04M 1/66* (2006.01)
- *H04M 1/68* (2006.01)
- *H04M 3/16* (2006.01)

(52) U.S. Cl. .................... 455/404.1; 455/410
(58) Field of Classification Search ............. 455/404.1, 455/410
See application file for complete search history.

(56) References Cited

U.S. PATENT DOCUMENTS

| | | | | |
|---|---|---|---|---|
| 5,524,145 A * | 6/1996 | Parker | .................. | 379/210.02 |
| 5,555,551 A * | 9/1996 | Rudokas et al. | ............. | 455/410 |
| 5,706,338 A * | 1/1998 | Relyea et al. | ................ | 379/189 |
| 5,761,289 A * | 6/1998 | Keshav | .................. | 379/210.01 |
| 5,790,645 A * | 8/1998 | Fawcett et al. | ............. | 379/189 |
| 5,937,043 A * | 8/1999 | He | .......................... | 379/114.14 |
| 5,960,338 A * | 9/1999 | Foti | ........................... | 455/405 |
| 6,148,190 A * | 11/2000 | Bugnon et al. | .......... | 455/404.1 |
| 6,570,968 B1 * | 5/2003 | Marchand et al. | ..... | 379/114.14 |
| 6,580,908 B1 * | 6/2003 | Kroll et al. | ............... | 455/435.1 |
| 6,636,592 B2 * | 10/2003 | Marchand et al. | ..... | 379/114.14 |
| 7,031,714 B1 * | 4/2006 | Rayburn | ..................... | 455/445 |
| 2002/0022474 A1 * | 2/2002 | Blom et al. | ................. | 455/410 |
| 2002/0186825 A1 * | 12/2002 | Marchand et al. | .......... | 379/188 |
| 2004/0037409 A1 * | 2/2004 | Crockett et al. | ........ | 379/210.02 |
| 2004/0192252 A1 * | 9/2004 | Aerrabotu et al. | ........ | 455/404.1 |

FOREIGN PATENT DOCUMENTS

WO    WO 9747152 A1 * 12/1997

OTHER PUBLICATIONS

"NENA Technical Information Document (TID) On PSAP Call Back to All 9-1-1 Callers, Combating Wireles E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.

* cited by examiner

*Primary Examiner*—William Trost
*Assistant Examiner*—Marivelisse Santiago-Cordero

(57) ABSTRACT

In the method of recognizing fraudulent emergency calls from a mobile station, a mobile station originating an emergency call is identified based on a mobile equipment identity received from the mobile station. A count of emergency calls received from the identified mobile station is generated and an incoming emergency call from the identified mobile station is determined as fraudulent based on the count.

28 Claims, 2 Drawing Sheets

METHOD OF RECOGNIZING FRAUDULENT WIRELESS EMERGENCY SERVICE CALLS

BACKGROUND OF THE INVENTION

The perpetration of fraudulent emergency service calls has risen to such significant levels that law enforcement and emergency responses are been dangerously hampered. Accordingly, the detection and reduction of fraudulent emergency service calls is of ever increasing importance. Detection and reduction of fraudulent emergency service calls begins with identifying the source of the fraudulent call. Historically this identification has been based on the unique calling party number (CgPN) assigned to the subscriber initiating the call. The CgPN may be the same as the call back number delivered to the Public Service Answering Point (PSAP) in association with the emergency service call. While this process proves workable for most land line devices, identifying the source of a fraudulent wireless call is much more difficult.

The CgPN for a mobile station (e.g., mobile phone) that originates any call is usually the mobile directory number (MDN), which is dialable, of the mobile station. For instance, the MDN is dialed by a caller and used to route a call through the network to the wireless subscriber's home system. At the subscriber's home system, the home location register (HLR) contains the mobile subscriber identifier (MSID) associated with the subscriber's MDN. The MSID, not the MDN, is then used to route the call through the network to the serving wireless system and page the subscriber. The subscriber's MDN is provided by the home system to the serving system in a separate data file called the subscriber profile. Typically, the MSID is either a 10-digit mobile identification number (MIN) or a 15-digit International Mobile Subscriber Identifier (IMSI) programmed into a mobile station by the service provider with whom the mobile station user has entered into a service agreement. Accordingly, an alternative way to identify the source of a wireless emergency service call is the MSID assigned to the mobile station by the service provider. However, the MSID is not necessarily a dialable number.

Unfortunately, either or both of the MDN and the MSID of a mobile station originating a wireless service call might be unknown—a so-called non-coded mobile station. The MDN or MSID could be unknown for many reasons, including (a) the mobile station was never intended to be registered (there are such phones to use for emergency calls only), (b) the phone is new and has not yet been registered with a service provider or (c) the subscription has expired and the mobile station is no longer registered with a service provider. Some mobile phones also support a removable User Identity Module (R-UIM) or Subscriber Identity Module (SIM) that may contain the MSID and the MDN. If the R-UIM or SIM are not in the mobile station, then the mobile station can still be used to place an emergency call. However, there is no MDN or MSID known to the mobile station or the serving system to provide the PSAP as a call back number.

Current standards permit a mobile station without a permanent MSID or without a MDN known to the serving system to originate an emergency service call. Accordingly, those who wish to perpetrate emergency service call fraud have turned to using cell phones and other forms of mobile stations. With current fraud prevention techniques, such a perpetrator; particularly those using non-coded mobile stations, are extremely difficult to recognize.

SUMMARY OF THE INVENTION

In the present invention, the source of a wireless emergency call is identified based on at least the mobile equipment identity (MEID) of the mobile station originating the emergency call. A switch (e.g., MSC) and/or Public Service Answering Point (PSAP) determines that a received emergency call from an identified source is fraudulent when the number of emergency call received from the identified source exceeds a threshold within a predetermined period of time.

In an exemplary embodiment of the present invention, the switch and/or PSAP maintains a database for emergency calls. The database includes an entry for each identified source of an emergency call. For example, each entry is identified by an MEID, or in another exemplary embodiment by a unique MEID, MSID pair. For each emergency call received in association with an MEID, an emergency call record is entered in the database in association with the MEID entry. Also, a time stamp is stored with the emergency call record. The time stamp indicates the time of receipt for the emergency call. When an emergency call is received, an emergency call count is generated by counting emergency call records having time stamps indicating receipt of an emergency call within a predetermined period of time ending with a currently received emergency call from the identified mobile station. If the emergency call count exceeds a threshold count, the emergency call is recognized as fraudulent and a fraud warning is entered into the database for the MEID.

When a call is recognized as fraudulent, some form of action can be taken. In one exemplary embodiment, the action taken is ignoring the emergency call; otherwise known as call blocking. In another exemplary embodiment, the emergency call is routed to the PSAP and the MSC signals the PSAP that the emergency call has been recognized as fraudulent. In yet another embodiment, the emergency call is routed to a pre-recorded message. In a further exemplary embodiment, the emergency call is routed to an operator that handles fraudulent calls.

The present invention further includes methodologies for managing the database at one or both of the MSC and PSAP. These methodologies govern the removal of emergency call records and/or the removal of an entry in the database. In one exemplary embodiment, when an emergency call record ages beyond the predetermined period of time, the emergency call record and associated time stamp are removed from the EVLR. In another exemplary embodiment, for a given source, the maximum number of emergency call records stored at the EVLR is the sum of the count threshold plus one. This helps conserve space within the EVLR.

In another exemplary embodiment of the present invention, a removal timer is set when an emergency call is received from a mobile station and a fraud warning is not already associated with the MEID in the EVLR. If the removal timer expires before another emergency call is received from the mobile station (this being determined based on MEIDs received with emergency calls), then the MEID entry for the mobile station is removed from the EVLR. In another embodiment, the PSAP operator determines based on feedback from personnel responding to the emergency call that the emergency call is valid, and removes the MEID entry from the EVLR. The PSAP then signals the MSC that the emergency call was valid and the MSC removes the MEID entry from its EVLR (e.g., automatically or manually). In yet another embodiment, a periodic reconciliation between the EVLR at the MSC with the EVLR at the PSAP is performed such that any MEID entry deleted from the EVLR at the PSAP is then removed from the EVLR at the MSC.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

As is known, when a mobile station makes an emergency call, the mobile station identifier (MSID) is supplied in association with the emergency call. For example, the MSID is the mobile identification number (MIN), a ten digit International Roaming Mobile Identification Number (IRM) for those 10 digit numbers outside the range of the North American Numbering Plan, or the International Mobile Subscriber Identifier (IMSI). As discussed above, there exist mobile stations with no MDN and/or no permanent MSID encoded therein—so-called non-coded mobile stations MSnc. An MSnc, however, should contain a default MSID (dMSID) used to identify and address (i.e., page) a MSnc in special circumstances such as when the MSnc is being activated by a service provider and encoded over the air for general use. It may also be used to page a MSnc to deliver an emergency call back.

The dMSID is standardized for some mobile phones. For example, for a CDMA MSnc used in ANSI/TIA/EIA-41 systems, the dMSID is a string of "0"s followed by the last four digits of the mobile station's mobile equipment identity. The dMSID can only be used to page a MSnc with caution since there is no complete certainty that a dMSID is unique. Mobile stations also contain a unique mobile equipment identity (MEID) encoded in the phone by the manufacturer. The MEID may be, for example, an electronic serial number (ESN) as used in ANSI/TIA/EIA-41 systems or an International Mobile Equipment Identity (IMEI) used in GSM systems. The MEID is independent of the MSID and MDN. The MEID is signaled over the air between the mobile station and the base station of a wireless system with a call origination attempt or soon thereafter. For example, if not supplied with the call origination attempt, the MEID is requested by the serving system.

Current standards for wireless emergency services call for delivering "911+the last seven digits of the MEID" to the PSAP as the call back number when the mobile directory number assigned to the mobile station is not available. While this may serve to identify the call to the PSAP and the serving system, this "911+MEID7" is not routable through the network and is not unique since it does not contain a complete MEID.

Figure 1:
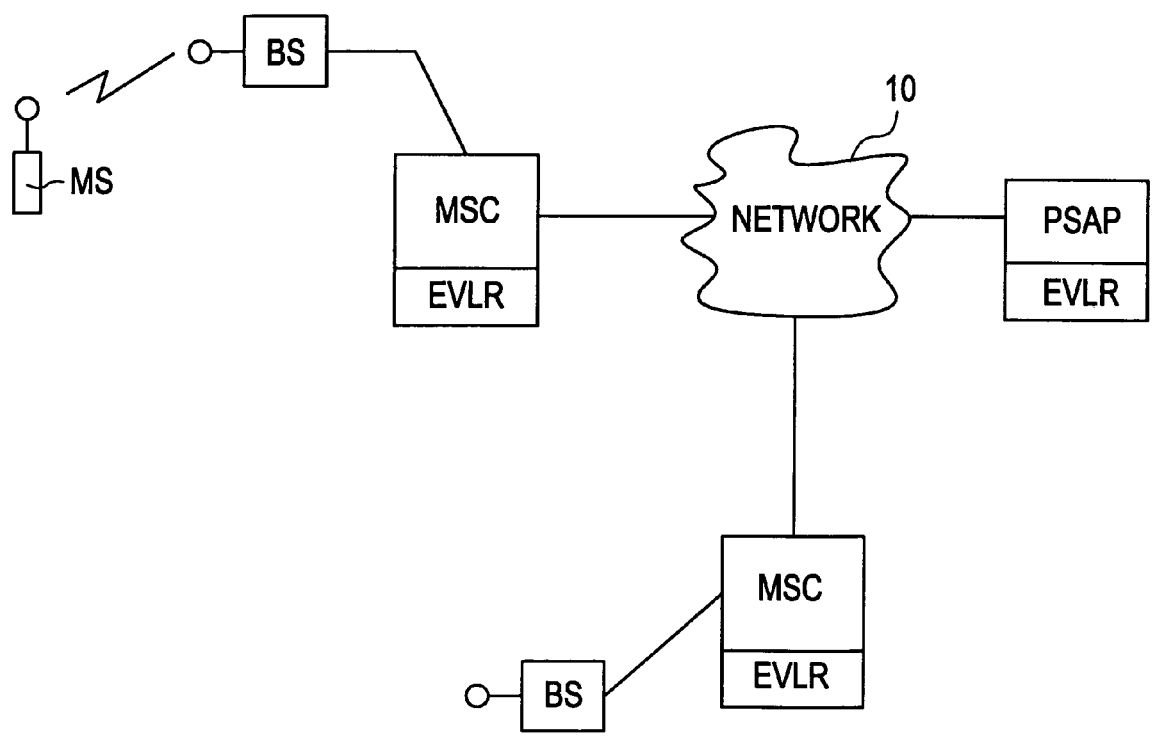
FIG. 1 illustrates a portion of a wireless serving system and PSAP employing the method of recognizing fraudulent, wireless emergency service calls according to an exemplary embodiment of the present invention.

FIG. 1 illustrates a portion of a wireless serving system and PSAP employing the method of recognizing fraudulent, wireless emergency service calls according to an exemplary embodiment of the present invention. As shown, a mobile station communicates with a mobile switching center (MSC) via a base station in a well-known manner. Emergency calls are routed by the MSC to a PSAP through well-known network 10. According to the present invention, one or both (as shown) of the MSC and the PSAP include emergency service location registers (EVLRs) that include records of the emergency service calls received from each mobile station on the basis of the MEIDs of the mobile stations. The operation of the method according to the present invention as implemented by the architecture of FIG. 1 will now be described. It will be understood, however, that the method of the present invention is not limited in its application to the architecture of FIG. 1.

Figure 2:
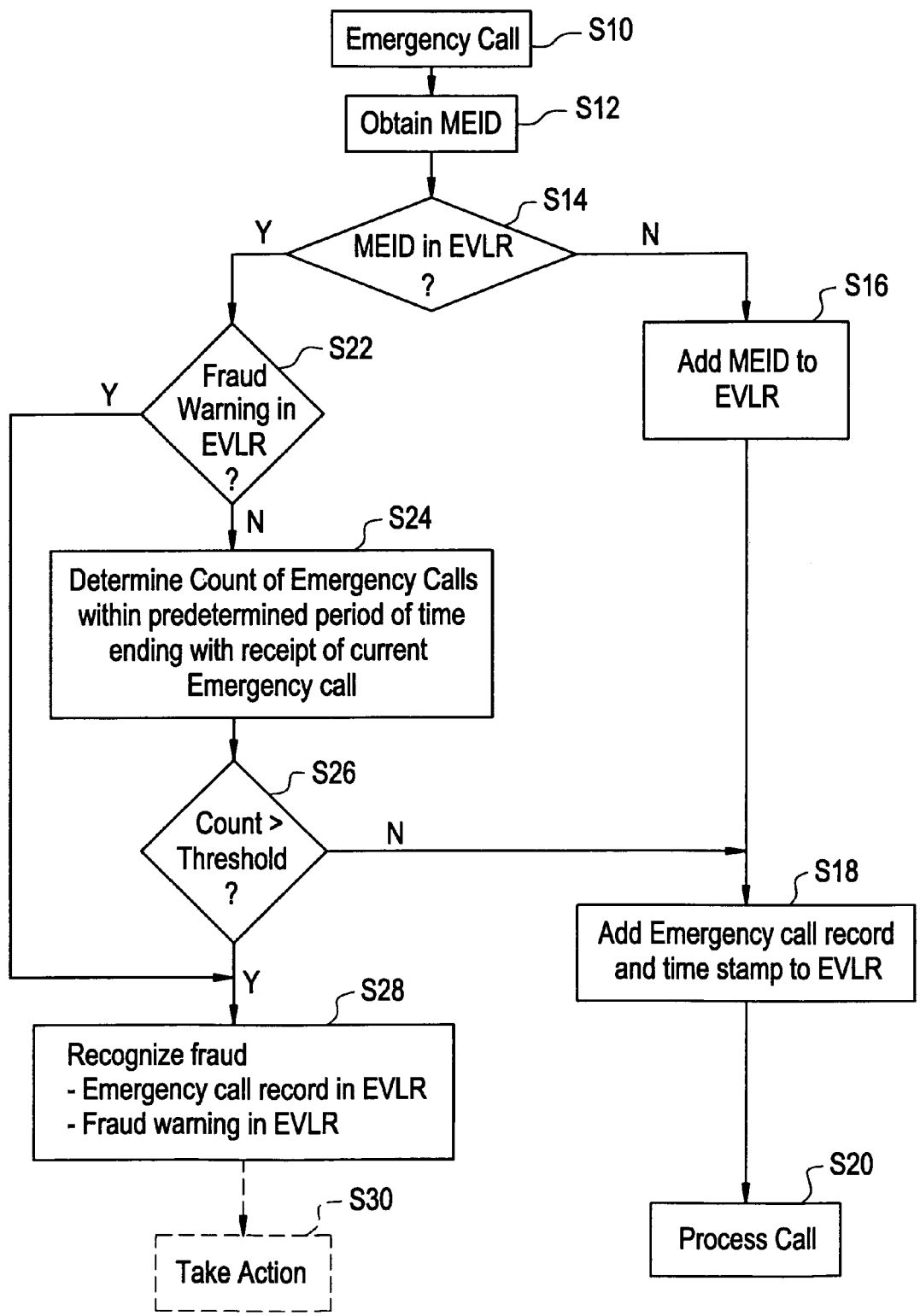
FIG. 2 illustrates a flow chart of the fraud recognition methodology according to an exemplary embodiment of the present invention.

According to an exemplary embodiment of the methodology of the present invention, when a switch (e.g., a MSC) of the wireless system receives an emergency call (e.g., a 9-1-1 call) from a mobile station, the MSC performs a process as illustrated in FIG. 2. As shown, the emergency service call is received in step S10, and the MSC obtains the full MEID and MSID (default or permanent) of the mobile station in step S12. The MSID is usually supplied with the emergency call. The MEID may be supplied with the emergency call, or alternatively, the MSC requests the mobile station to send the MEID.

Next, in step S14, the MSC determines if the EVLR at the MSC includes the received MEID. If not, the MSC creates a new entry in the EVLR. Specifically, the MSC adds the received MEID to the EVLR in step S16.

Then in step S18, the MSC adds the emergency call record for the emergency call in the EVLR in association with MEID and enters the time of the emergency call (referred to as a time stamp) in association with the emergency call record. Then, in step S20 the MSC processes the emergency call. Processing of the emergency call will be described in detail later in this disclosure.

If, in step S14, the MSC determines that the MEID received with the emergency call is in the EVLR, then in step S22, the MSC accesses the EVLR and determines if a fraud warning record has been entered in association with the MEID. If not, the MSC accesses the emergency call records for the MEID and counts, in step S24, the number of emergency calls that have been received within a predetermined period of time ending with the current emergency call. The MSC makes this determination based on the time stamps entered with each emergency call record of the MEID. The predetermined period of time is a controllable parameter set by the network operator, and may be subject to government regulation in the future. Next, in step S26, the MSC determines if the emergency call count exceeds a count threshold. If so, the MSC recognizes the current emergency call as being a fraudulent emergency call and enters a fraud call warning record in the EVLR with the MEID of the mobile station in step S28. An emergency call record is also entered for the current emergency call. The count threshold is also a controllable parameter set by the network operator, and may be subject to government regulation at some future date.

Accordingly, it will be appreciated that by setting the count threshold and the predetermined period of time a network operator establishes the number of emergency calls that a mobile station can make within a period of time before an emergency call from the mobile station is considered fraudulent. For example, a service provider may decide it is unlikely that another fraudulent emergency call from the same mobile station will be made four hours after the last call. In this example, the network operator would set the predetermined period of time to four hours and would set the count threshold to some value less than 1 but greater or equal to zero. Accordingly, receiving a second emergency call from the same mobile station within four hours from the first emergency call, would result in the MSC determining an emergency call count of one in step S24 and a judgement that the emergency call count exceeded the count threshold in step S26. As a result, the second emergency call would be recognized as a fraudulent emergency call in step S28.

By contrast if a second emergency call from the same mobile station were not received until five hours after the first emergency call, the count would have been determined as zero. As a result, in step S26 the MSC would determine that the emergency count is not greater than the count threshold. And, in step S18 the MSC would add the second emergency call as a record in the EVLR in association with the MEID entry and enters the time stamp of the second emergency call in association with the emergency call record.

If the MSC recognizes the current emergency call as fraudulent then, optionally, in step S30, the MSC takes some form of action. In one exemplary embodiment, the action taken is ignoring the emergency call; otherwise known as call blocking. In another exemplary embodiment, the emergency call is routed to the PSAP and the MSC signals the PSAP that the emergency call has been recognized as fraudulent. In yet another embodiment, the emergency call is routed to a pre-recorded message. In a further exemplary embodiment, the emergency call is routed to an operator that handles fraudulent calls. The operator is tasked with keeping the caller involved in the call long enough for the caller to be located and dealt with by the proper authorities. It will be appreciated that a combination of the above-described actions could be performed. It will also be appreciated that system designers will develop other possible actions, and/or that the actions taken may be dictated by government regulation in the future.

Returning to step S22, if the MSC determines that a fraud warning record has already been entered for the MEID received with the emergency call, then processing proceeds directly to step S28.

If in the methodology described above, the MSC decides to process the emergency call as in step S20, the MSC sends the emergency call to the PSAP serving the MSC. In sending the emergency call to the PSAP, the MSC supplies its emergency location number (ELRN) to the PSAP as the calling party number (CgPN), and also provides the PSAP with the MEID of the mobile station (e.g., in the ISUP generic address parameter). The MSC also stores the MSID in association with the MEID in a mapping table for emergency call back purposes.

A In an exemplary embodiment of the method according to the present invention, a unique routable call back number is assigned to each switch (e.g., a mobile switching center (MSC)) in a wireless communication system. This number is referred to as an "Emergency Local Routing Number" or ELRN. The ELRN can be thought of as similar to the local routing number (LRN) assigned to each local switch to implement wireless number portability (WNP) or thousands block number pooling (TBNP). However, an ELRN can only be routed to the switch that owns the number, and the ELRN for each switch is unique and is not portable.

Because the ELRN of the MSC is received as the CgPN at the PSAP, the PSAP knows the MSC that is handling the emergency call. Furthermore, as described in detail below, because the PSAP receives the MEID of the mobile station as well, the PSAP can perform the same fraud recognition methodology as the MSC.

When the PSAP receives an emergency call from the MSC, the PSAP performs the methodology of FIG. 2, except that the count threshold and predetermined period of time values are not necessarily the same as that used by the MSC. Performing the methodology of FIG. 2 at the PSAP strengthens the level of fraud protection; particularly, against those perpetrators who are clever enough to make fraudulent emergency calls from different locations such that different MSCs are receiving the fraudulent emergency calls. As a result, the emergency call counts in the EVLR of the PSAP can differ from those at the MSCs.

If the emergency call is processed in step S20 by the PSAP, the PSAP handles the emergency call in the conventional manner.

In a further exemplary embodiment, entries in the EVLR are based on a unique MSID, MEID pairs. As mentioned previously, some mobile stations require the use of a SIM card to provide an MDN and a MSID. Accordingly, such mobile stations could be used by two or more entirely different users. Each user would insert their SIM card to originate phone calls, etc. Consider the following example situation: a mobile station is provided in a taxi for its patrons. A first user, while riding in the taxi, uses his SIM card in the mobile phone to place an emergency call regarding an accident that the taxi passed. The first user exits the taxi and the taxi picks up a second user. The second user, with his own SIM card, then uses the same mobile station to place an emergency call regarding the same accident. Both calls are valid emergency calls. Therefore, it may be desirable to distinguish between different users of the same mobile station in determining whether an emergency call is fraudulent. This can be accomplished following the methodology of the present invention, except that each entry in the EVLR is not based solely on the MEID. Instead, each entry is based on a unique MEID, MSID pair. Accordingly, referring to FIG. 2, step S14 will determine if the unique MEID, MSID pair exists in the EVLR as an entry and step S16 will add the unique MEID, MSID pair entry to the EVLR.

Next, techniques for managing the EVLRs at the MSC and PSAP will be described. The described techniques are applicable to any of the above-described embodiments. In one exemplary embodiment, when an emergency call record ages beyond the predetermined period of time, the emergency call record and associated time stamp are removed from the EVLR. In another exemplary embodiment, for a given source (e.g., MEID or MEID, MSID pair), the maximum number of emergency call records stored at the EVLR is the sum of the count threshold plus one.

In another exemplary embodiment of the present invention, a removal timer is set when an emergency call is received from a mobile station and a fraud warning is not already associated with the MEID in the EVLR. If the removal timer expires before another emergency call is received from the mobile station (this being determined based on MEIDs received with emergency calls), then the MEID entry for the mobile station is removed from the EVLR.

In another embodiment, the PSAP operator determines based on feedback from personnel responding to the emergency call that the emergency call is valid, and removes the MEID entry from the EVLR. The PSAP then signals the MSC that the emergency call was valid and the MSC removes the MEID entry from its EVLR.

In yet another embodiment, a periodic reconciliation between the EVLR at the MSC with the EVLR at the PSAP is performed such that any MEID entry deleted from the EVLR at the PSAP is then removed from the EVLR at the MSC.

Periodic audits of the EVLRs can be conducted as well to (a) remove MEIDs which have not been called since the last audit (this could be determined by comparing the time stamps of emergency calls at each audit); (b) remove MEID entries for valid emergency calls (e.g., if a separate valid emergency call list is kept at the PSAP, this process permits updating the EVLRs at the PSAP and MSC based on such a list); etc.

It will be appreciated that a combination of the EVLR management techniques discussed above could also be performed.

The invention being thus described, it will be obvious that the same may be varied in many ways. For example, many PSAPs serving a particular area could share a single EVLR or pool EVLR data. This further strengthens the fraud protection; particularly against those perpetrators that move between different PSAP serving areas. Such variations are not to be regarded as a departure from the spirit and scope of the invention, and all such modifications are intended to be included within the scope of the following claims.

We claim:

1. A method of recognizing fraudulent emergency calls from a mobile station, comprising:
   identifying a source of an emergency call based on a mobile equipment identity received from a mobile station originating the emergency call;
   counting a number of emergency calls received from the identified source;
   deciding whether an incoming emergency call from the identified source is fraudulent by comparing the counted number of emergency calls and a count threshold value; and
   forwarding the incoming call to a fraudulent call handling entity if the counted number of emergency calls exceeds a threshold value.

2. The method of claim 1, wherein
   the counting step counts the number of emergency calls received from the identified source within a predetermined period of time ending with a currently received emergency call from the identified source.

3. The method of claim 1, further comprising:
   storing, in a database, an emergency call record for each emergency call in association with the mobile equipment identity appearing as a source entry in the database.

4. The method of claim 3, wherein the counting step counts emergency call records of emergency calls received within a predetermined period of time ending with a currently received emergency call from the identified source.

5. The method of claim 3, wherein the storing step stores a time stamp in association with each emergency call record, the time stamp indicating a time that an emergency call associated with the emergency call record was received.

6. The method of claim 5, wherein the counting step counts emergency call records having time stamps indicating receipt of an emergency call within a predetermined period of time ending with a currently received emergency call from the identified source.

7. The method of claim 6, further comprising:
   removing an emergency call record from the database when the time stamp for the emergency call record is greater than the predetermined period of time.

8. The method of claim 7, further comprising:
   removing a source entry from the database based on a received signal.

9. The method of claim 7, further comprising:
   removing a source entry from the database when a predetermined event occurs.

10. The method of claim 6, further comprising:
    removing an oldest emergency call record from the database when a number of call records exceeds a sum of the count threshold plus one.

11. The method of claim 1, further comprising:
    blocking the incoming emergency call when the deciding step decides that an incoming call is fraudulent.

12. The method of claim 1, further comprising:
    routing the incoming emergency call to a recorded message when the deciding step decides that an incoming emergency call is fraudulent.

13. The method of claim 1, further comprising:
    routing the incoming emergency call to an operator handling fraudulent emergency calls when the deciding step decides that an incoming emergency call is fraudulent.

14. The method of claim 1, wherein the identifying, counting and deciding steps are performed at a mobile switching center.

15. The method of claim 1, wherein the identifying, counting and deciding steps are performed at a PSAP.

16. The method of claim 1, wherein the identifying step identifies a source based on the mobile equipment identity and a mobile station identifier received from the mobile station originating the emergency call.

17. The method of claim 16, further comprising:
    storing, in a database, an emergency call record for each emergency call in association with a unique pair of the mobile equipment identity and the mobile station identifier appearing as a source entry in the database.

18. A method of recognizing fraudulent emergency calls from a mobile station, comprising:
    performing, at a first network entity, the steps of,
        generating a first count of emergency calls received at the first network entity from a source, and
        deciding whether an incoming emergency call from the source is fraudulent based on the first count; and
    performing, at a second network entity, the steps of,
        generating a second count of emergency calls received at the second network entity from the source, and
        deciding whether an incoming emergency call from the source is fraudulent based on the second count.

19. The method of claim 18, wherein the source is identified at the first and second network entities based on a mobile equipment identity of a mobile station originating the emergency call.

20. The method of claim 19, wherein the source is identified at the first and second network entities based on the mobile equipment identity and a mobile station identifier of the mobile station.

21. The method of claim 19, wherein
    the performing at a first network entity step includes
        storing, in a first database, an emergency call record and time stamp for each emergency call in association with the mobile equipment identity appearing as a source entry in the database, the time stamp indicating a time that an emergency call associated with the emergency call record was received, and wherein
    the generating step generates the count by counting emergency call records having time stamps indicating receipt of an emergency call within a predetermined period of time ending with a currently received emergency call from the identified source; and the performing at a second network entity step includes.
storing, in a second database, an emergency call record and time stamp for each emergency call in association with the mobile equipment identity appearing as a source entry in the database, the time stamp indicating a time that an emergency call associated with the emergency call record was received, and wherein the generating step generates the count by counting emergency call records having time stamps indicating receipt of an emergency call within a predetermined period of time ending with a currently received emergency call from the identified source.

22. The method of claim 21, wherein the performing at a second network entity step includes removing a source entry from the second database when a first predetermined event occurs; and the performing at a first network entity step includes periodically reconciling the first database with the second database to remove source entries from the first database.

23. The method of claim 22, wherein the first predetermined event is failure to receive an emergency call from the source after another predetermined period of time.

24. The method of claim 22, wherein the first predetermined event is an instruction received from a user.

25. The method of claim 22, wherein the performing at a first network entity step includes removing the source entry from the first database when a second predetermined event occurs.

26. The method of claim 18, wherein the first network entity is a mobile switching center and the second network entity is a PSAP.

27. The method of claim 18, wherein the performing at a first network entity step includes one of blocking the incoming emergency call and routing the emergency call to a predetermined destination when the deciding at the first network step decides that an incoming call is fraudulent.

28. The method of claim 18, wherein the performing at a second network entity step includes one of blocking the incoming emergency call and routing the emergency call to a predetermined destination when the deciding at the second network step decides that an incoming call is fraudulent.

* * * * *